Figure 1:
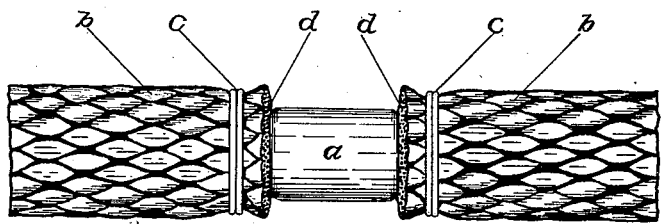

J. P. TOLMAN & J. L. BIXBY, Jr.
ROPE COUPLING.
APPLICATION FILED APR. 1, 1910.

999,914.

Patented Aug. 8, 1911.

WITNESSES:

INVENTORS
James P. Tolman
John Lewis Bixby, Jr.

BY

ATTORNEYS

UNITED STATES PATENT OFFICE.

JAMES P. TOLMAN, OF NEWTON, AND JOHN LEWIS BIXBY, JR., OF ARLINGTON, MASSACHUSETTS, ASSIGNORS TO SAMSON CORDAGE WORKS, OF BOSTON, MASSACHUSETTS, A CORPORATION OF MASSACHUSETTS.

ROPE-COUPLING.

999,914.	Specification of Letters Patent.	Patented Aug. 8, 1911.

Application filed April 1, 1910. Serial No. 552,789.

*To all whom it may concern:*

Be it known that we, JAMES P. TOLMAN, of Newton, in the county of Middlesex and State of Massachusetts, and JOHN LEWIS BIXBY, Jr., of Arlington, in said county and State, both citizens of the United States, have invented a new and useful Improvement in Rope-Couplings, of which the following is a specification.

Our invention relates to rope couplings for use especially in coupling the ends of transmission ropes so-called, composed of a core and one or more layers of covering. As shown it is applied to a rope having a core comprising wire strands and an outer layer of fibrous material such as hemp, though it is capable of other uses.

In coupling the ends of a transmission rope together it is desirable, if not necessary, (*a*) that the coupling shall be of less diameter than the rope so that it shall not come in contact with the sheave over which the rope runs; (*b*) that it shall be of such length that the portion of the rope attached to it shall not be given a short bend as the coupling passes around or over a sheave; (*c*) that it shall be so simple as to be capable of attachment to the rope at the place of use or elsewhere by any ordinary mechanic without previous experience, and that it may be coupled or uncoupled in working position with the least possible delay; (*d*) that it shall be of a strength considerably greater than its working load. These various features are embodied in the coupling shown in the drawings and now to be described which coupling is the best embodiment of our invention now known to us.

Our invention will be understood by reference to the drawings, in which—

Figure 2:
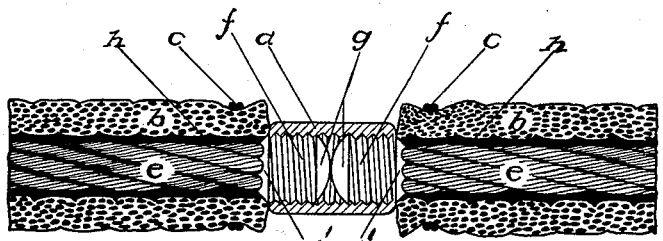
Figures 3, 4, 5:
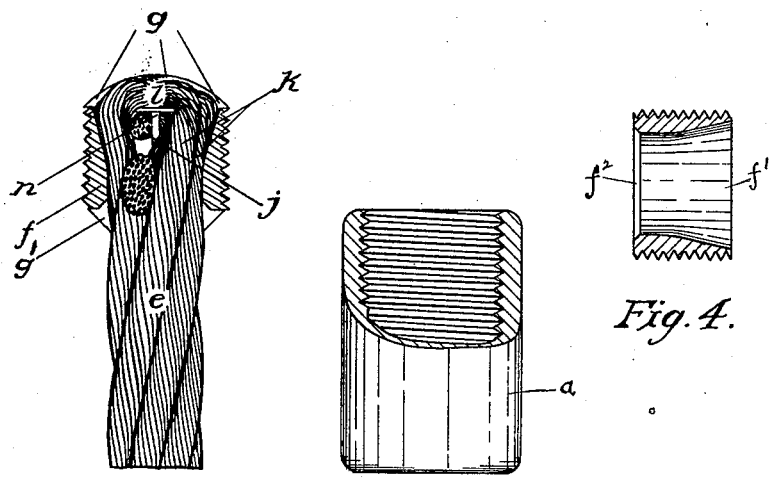

Figure 1 is a view in elevation showing two ends of rope coupled by a coupling embodying our invention. Fig. 2 is a longitudinal section through the rope and the coupling sleeve. Fig. 3 is an enlarged view showing the preferred mode of attaching the core to the thimble, the exterior of the rope being omitted and the thimble and one of the strands being shown in section. Fig. 4 is a section of one of the thimbles, and Fig. 5 is a view partly in section of the sleeve.

In the form of our invention shown, $a$ is the sleeve or coupling proper which unites the members attached to the two ends of the rope. The rope as shown comprises a core $e$ made of wires $l$ laid to form strands $k$ which in turn are laid about a hemp or other fibrous center $j$ to form the core, the whole being covered with a fibrous covering $b$ which is attached to the core by a vulcanized matrix $h$ as described in our application for Letters Patent of the United States, Serial No. 447,775, filed August 10, 1908. The use of our invention is not confined to this kind of rope although intended especially for use with a rope, the interior of which comprises wire strands.

The coupling as a whole comprises thimbles $f$ threaded on their exteriors and the sleeve $a$ threaded on its interior to receive said thimbles.

The thimbles are alike and one of them is shown in section in Fig. 4 as well as in Fig. 3 where there is also illustrated a convenient means of attaching the wire strands thereto. It will be noted that each thimble has a passage through it and the internal diameter of the thimble at one end $f^1$ is slightly larger than at the other end $f^2$, the passage tapering from its large end to its small end. As shown in Fig. 3 the smaller diameter of the passage is large enough only to receive the core $e$. In attaching the thimble to the core the core is pushed through it and it is then enlarged or spread to fill the enlarged end of the thimble. As shown this is accomplished by means of a tack $n$ driven down into the hemp center of the core so as to expand its strands into the enlarged end $f^1$ of the socket of the thimble, as by a wedge. The ends of the wire strands are then bent over at right angles toward the center of the passage so that they lie over the tack and their ends are trimmed off and hammered down so that they lie within the passage through the thimble. Solder is then applied at $g$ to hold these ends in place with relation to themselves and the end of the thimble and it is also applied to the other end of the thimble to tie it to the rope as at $g^1$. The core is thus held in place in the thimble not only because its end is enlarged by the tack but also because the two are soldered together. The fibrous covering is cut off approximately even with the end of the thimble $f$ and its ends $d$ are bound by a wire $c$. Each end of the core being thus treated the thimbles are screwed into the two ends of the sleeve *a*. In practice the sleeve is screwed first on to one thimble. The other end of the rope is turned back a number of times corresponding to the number of threads in its thimble and the thimble is then screwed into the sleeve. When it is in place therefore there is no tendency of the rope to unscrew from the sleeve.

It will be seen that such a coupling fulfils the requirements of a coupling as stated above. It is sufficiently small in diameter compared with the rope not to grind on the sheave and sufficiently short to take substantially the direction of the rope as it passes over the sheave. It is strong for the enlarged diameter of the core holds it in the thimble and that diameter cannot be reduced. While we have shown it attached to a rope having a wire core and a fibrous covering, it may be used equally well with ropes of other materials, the solder of course only being used when the rope has a wire core.

What we claim as our invention is:

1. In combination with two rope ends, each comprising a core and a covering, two thimbles each smaller in diameter than said rope and each adapted to receive the end of the core of one of said rope ends, each thimble having a passage through it larger at one end than at the other, the end of each core being adapted to pass through said passage and being enlarged to fill the larger end thereof, and a coupling sleeve also smaller in diameter than said rope and adapted to engage said thimbles.

2. In combination with two rope ends, each comprising a core and a covering, two thimbles each smaller in diameter than said rope and each adapted to receive the end of the core of one of said rope ends, each thimble having a passage through it larger at one end than at the other, the end of each core being adapted to pass through said passage and being enlarged to fill the larger end thereof, and a coupling sleeve also smaller in diameter than said rope and adapted to engage said thimbles, said covering being confined about said core in rear of its thimble.

JAMES P. TOLMAN.
JOHN LEWIS BIXBY, Jr.

Witnesses:
BERTHA J. MERRILL,
MARY G. CONNORS.

---

Copies of this patent may be obtained for five cents each, by addressing the "Commissioner of Patents, Washington, D. C."